United States Patent [19]

Miller et al.

[11] Patent Number: 4,475,130

[45] Date of Patent: Oct. 2, 1984

[54] METHOD AND MEANS FOR THE REAL-TIME STORAGE OF IMAGES CAPTURED BY AN ELECTRONIC SCANNING CAMERA

[75] Inventors: Armin Miller, Palo Alto; Lauren V. Merritt, Los Altos; Charles A. Lindberg, Menlo Park, all of Calif.

[73] Assignee: Datacopy Corporation, Mountainview, Calif.

[21] Appl. No.: 265,411

[22] Filed: May 19, 1981

[51] Int. Cl.³ .................. H04N 5/781; H04N 5/782; H04N 5/84; H04N 5/85

[52] U.S. Cl. .................................. 358/335; 358/342; 358/345; 358/906; 358/296; 358/301; 358/302; 360/35.1

[58] Field of Search ................... 360/33.1, 35.1; 358/335, 342, 296–304, 345, 906, 285–286, 293–294, 213

[56] References Cited

U.S. PATENT DOCUMENTS

| | | |
|---|---|---|
| 3,652,793 | 3/1972 | Farr et al. ............................ 358/293 |
| 3,832,484 | 8/1974 | Tanaka ................................. 358/296 |
| 3,867,569 | 2/1975 | Watson ................................. 358/294 |
| 3,899,035 | 8/1975 | Rothgordt ........................... 358/294 |
| 4,074,324 | 2/1978 | Barrett ................................. 358/296 |
| 4,112,469 | 5/1978 | Paranjpe et al. .................... 358/296 |
| 4,131,919 | 12/1978 | Lloyd et al. ......................... 360/9.1 |
| 4,149,091 | 4/1979 | Crean et al. ......................... 250/566 |
| 4,257,071 | 3/1981 | Lamb ................................... 358/286 |
| 4,266,251 | 5/1981 | Hara et al. ........................... 358/286 |
| 4,314,282 | 2/1982 | Fischbeck et al. .................. 358/286 |
| 4,321,627 | 3/1982 | Hooker et al. ...................... 358/286 |

Primary Examiner—Raymond F. Cardillo, Jr.
Attorney, Agent, or Firm—Owen L. Lamb

[57] ABSTRACT

A high-resolution, electronic camera with real-time storage capability. The image at the focal plane of a lens (5) is electronically scanned in one direction by a linear photodiode array (1), and in the orthogonal direction by a carriage (3), motor (17), and leadscrew (13) subassembly which mechanically moves the array with respect to the lens. The motion of the array is directly translated into comparable relative motion of a recording head (19) with respect to a recording media (21) so that scanned pixel information is recorded on the media (21) concurrently with its generation.

20 Claims, 4 Drawing Figures

FIG. 3  THE PLAYBACK STATION

THE DATA RECOVERY CIRCUITS

METHOD AND MEANS FOR THE REAL-TIME STORAGE OF IMAGES CAPTURED BY AN ELECTRONIC SCANNING CAMERA

BACKGROUND OF THE INVENTION

1. Field of the Invention

The invention relates to optical-scanning systems and, more particularly, to a method and apparatus for the direct recording of electrical signals corresponding to a scanned image onto a moving recording medium.

2. Description of the Prior Art

Considerable effort has been expended over at least the last decade towards converting an optical image to an electrically processible equivalent through the use of photodiode arrays. Because of limitations in semiconductor chip area, the available photodiode arrays are either square arrays of relative low resolution, or linear arrays of relatively high resolution. Various mechanisms have been developed to move linear arrays perpendicular to their axes so that they can provide area coverage similar to the square arrays. U.S. Pat. Nos. 4,149,091 (Crean et al.) and 3,867,569 (Watson) are descriptive of such mechanisms.

The above patents transmit the electrical information developed. U.S. Pat. No. 4,131,919 (Lloyd et al.) discloses apparatus for storing the electrical information. The method involves digitizing the information in each pixel, doing short-term electronic buffer storage, and then long-term magnetic storage. This is one approach to resolving the problem of the difference between the relative data rates of the information generator and the final storage media. Lloyd et al. are forced thereby to do the storage operation twice. While this duplication of effort is possible with the relatively small amount of information developed by a square array, the amount of information generated by a mechanically transported linear array makes such intermediate storage essentially impossible.

It is of interest to go through a numerical example to demonstrate the magnitude of the problem. It is possible to fabricate 1,600 photodiodes on a block of silicon. These could be arranged in a 40-point × 40-point square array. If the output of each diode were digitized onto 8 bits, the intermediate buffer would have to store 12,800 bits. If the photodiodes were organized into a single line and mechanically transported to observe a square area 1,600 points by 1,600 points, there would be a $2.56 \times 10^6$ pixels or $2 \times 10^7$ bits of information generated.

An electronic camera that can be moved around easily has an additional value over those that are so bulky as to be immobile. The intermediate storage requirements of a mechanically transported linear array, whose information is processed using the method disclosed by Lloyd et al., would result in a rather hefty system regardless of the nature of the scanning mechanism.

SUMMARY OF THE INVENTION

The object of this invention is to provide a high-resolution electronic camera which is able to store the electronic information generated by mechanically moving a linear photodiode array.

In a preferred embodiment incorporating the invention there is focusing lens for projecting an image to be scanned onto a linear photodiode array. The photodiode array is mounted on a carriage that is moved at a measured rate of travel in the image plane of the lens. A recording head is mechanically linked to this carriage so that it moves across a recording media simultaneously with the motion of the photodiode array across the image plane. The recording media is simultaneously moved in a direction orthogonal to the recording head motion so that the recorded pixel information has a spatial correlation with the electrical signals generated by the photodiode array as it scans the image focused in the image plane. The net relative motion of the recording head and recording medium has the benefit of spreading out the recorded pixel information so that its density in terms of pixels per square inch on the recording media is reasonable.

In an alternative embodiment incorporating the invention, electronic circuitry is provided to control the motion of the photodiode array, and the mechanically- or electronically-linked recording head with respect to the recording medium, to thereby simultaneously record onto the recording medium the pixel information as it is generated.

In an alternative embodiment incorporating the invention, a magnetic recording medium is used and a voltage-to-time converter is provided to control the spacings of the magnetic transitions impressed into the magnetic medium in direct proportion to the amount of light collected by the individual photodiodes, so that the gray-scale and timing information of each pixel is preserved.

The foregoing and other objects, features, and advantages of the invention will be apparent from the following, more detailed, description of a preferred embodiment of the invention, as illustrated in the accompanying drawings.

BRIEF DESCRIPTION OF THE DRAWINGS

FIG. 5 is a timing diagram illustrating signal levels at various points within the block diagram of FIG. 2.

DESCRIPTION

Figure 1:
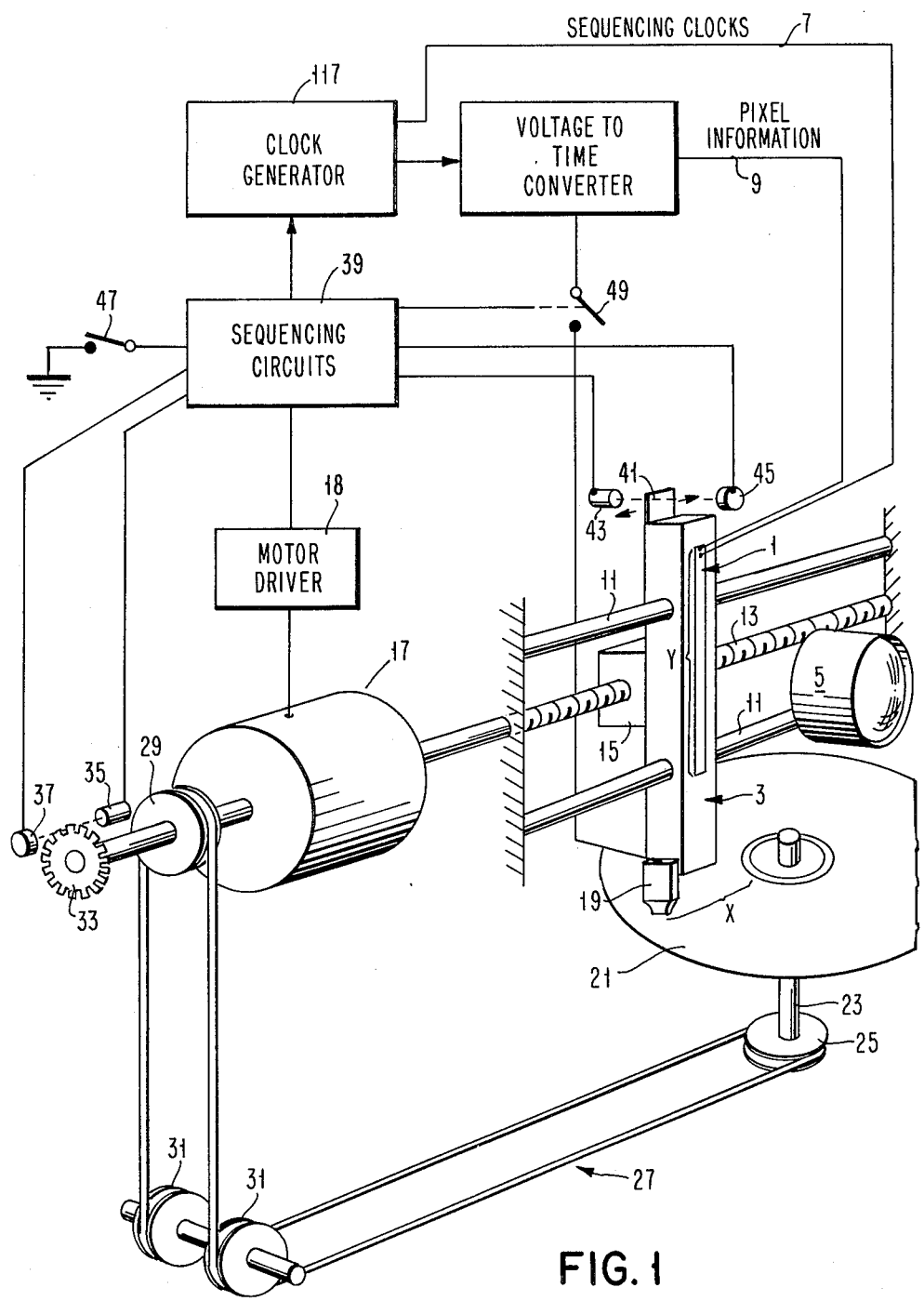
FIG. 1 is a drawing of the camera mechanism along with a block diagram of its controlling electronics.

Referring to FIG. 1, the camera mechanism and its support electronics will be described. Linear photodiode array (1) is mounted on a carriage (3) in the focal plane of lens (5). Clock signals (7) cause the sequencing of the access circuits built into the array (1) so that the outputs of successive photodiodes appear in sequence on the pixel information line (9). Since the number of photoelectrons from each photodiode is a function of the illumination level and the time between successive scans (the output is a quanta of charge, not a current flow), the clock signals (7) are precisely controlled and run continuously. The motion of the carriage (3) in the focal plane, perpendicular to the line of the array (1), is constrained by a leadscrew (13) and a nut (15) which is mounted on the carriage (3). Rotation of motor (17) will thus cause the carriage (3) to scan the focal plane of the lens (5). In this preferred embodiment, the lens (5) is held stationary with respect to the moving carriage (3); however it will be understood by those skilled in the art that systems in which the lens is moved and the carriage is held stationary are considered to be within the scope of the present invention. The carriage assembly shown in FIG. 1 is more fully described in copending application Ser. No. 06/078,204, of Charles A. Lindberg, entitled "Electronic Camera Employing a Solid-State Image Sensor," filed on Sept. 24, 1979, and assigned by Datacopy Corporation, the assignee of the present application which should be consulted for details concerning the carriage assembly.

A recording head (19) is also mounted on carriage (3). A recording disk (21) is placed so that the head (19) will move along a radius (R) of the disk (21) as the carriage (3) moves along guide bars (11). In this preferred embodiment, the recording medium, rotating disk (21), is held stationary laterally with respect to the head (19) on the moving carriage (3); however it will be understood by those skilled in the art that systems in which the head is held stationary and recording medium is moved laterally on carriage (3) with respect to the head are considered to be within the scope of the present invention. The disk is mounted on shaft (23) which has a pulley (25) which is driven by cable (27), which cable is in turn driven by a pulley (29) located on the shaft of the carriage drive motor (17). Idlers (31) enable the cable (27) to turn the 90° corner required. Thus, it is seen that the operation of array (1) and motor (17) causes an X-Y scan of an image focused in the focal plane of lens (5) that is simultaneous with an R-O scan of disk (21). In this preferred embodiment, the disk (21) is a magnetic recording disk and the recording head (19) is a magnetic recording head. It will be understood by those skilled in the art that systems which use other means of recording are considered to be within the scope of the present invention, such as, but not limited to, magnetic recording tape; video disks with a laser or other type of recording head; or photographic film with an optical recording head.

Chopper wheel (33), also mounted on a shaft of motor (17), serves to repeatedly interrupt the light beam from lamp (35) to photodetector (37). This combination of components provides the sequencing circuits (39) with electrical signals related to the angular position of the motor (17) from which the speed of the motor (17) and the relative position of the carriage (3) can be derived.

A flag (41) mounted on carriage (3) in such a position as to pass between a lamp (43) and a photodetector (45) will interrupt the light beam from lamp (43) to photodetector (45) when the carriage (3) is in the withdrawn position.

The following describes the sequence of events as a picture is captured and recorded on the disk (21). The carriage (3) is normally in the withdrawn position so that flag (41) is blocking the light from lamp (43). A momentary actuation of start switch (47) will cause the sequencer (39) to turn on motor (17) in the correct direction to scan an image focused in the image plane of lens (5). Recording is not commenced immediately since the pixel information, being clocked out of the array at a fixed frequency, would be packed too close together on the slowly moving disk. When the motor (17) is rotating fast enough, as indicated by the frequency generated by chopper wheel (33), so that the pixel information recorded on disk (21) would be reproducible, record-enable switch (49) is closed by a signal from the sequencer (39). Pixel information is then transferred from array (1) and immediately recorded on disk (21). The pulses from chopper wheel (33) are counted to determine when the carriage (3) has traveled far enough to the right to complete a full scan of the image. When this has occurred, the record-enable switch (49) is opened so that no more recording is done. Simultaneously, the polarity of the voltage provided to the motor (17) by motor driver (18) is reversed so that the carriage (3) begins a retrace of its earlier motion. When flag (41) again interrupts the light beam between lamp (43) and detector (45), the operating sequence is complete and sequencer (39) turns motor (17) off.

Various changes in form and detail will be apparent to those skilled in the art. For example, several possible variations, but by no means an exhaustive list, are: moving the lens (5) relative to a stationary array (1); moving the lens (5) and the array (1) together; using a second lamp and photo-detector pair like items (43, 45) to determine end of travel; mounting the motor (17) on shaft (23) so that carriage (3) is moved by the cable (27) and pulley (25, 29) arrangement; using a separate motor to drive the shaft (23); using a linear motor to drive the carriage (3) while retaining a rotary motor for driving disk (21); causing the head (19) to spin in the style of the disk (21) shown while the recording media moves in a linear fashion similar to that of the carriage (3); causing a narrow magnetic tape to move around a circularly spinning magnetic head in the style of videotape recorders; causing a narrow magnetic tape to move rapidly by a stationary recording head or heads, etc. All such mechanism variations are included in the spirit of the present invention, so long as they provide for the recording of pixel information simultaneously with its generation by a photodiode array.

Figure 2:
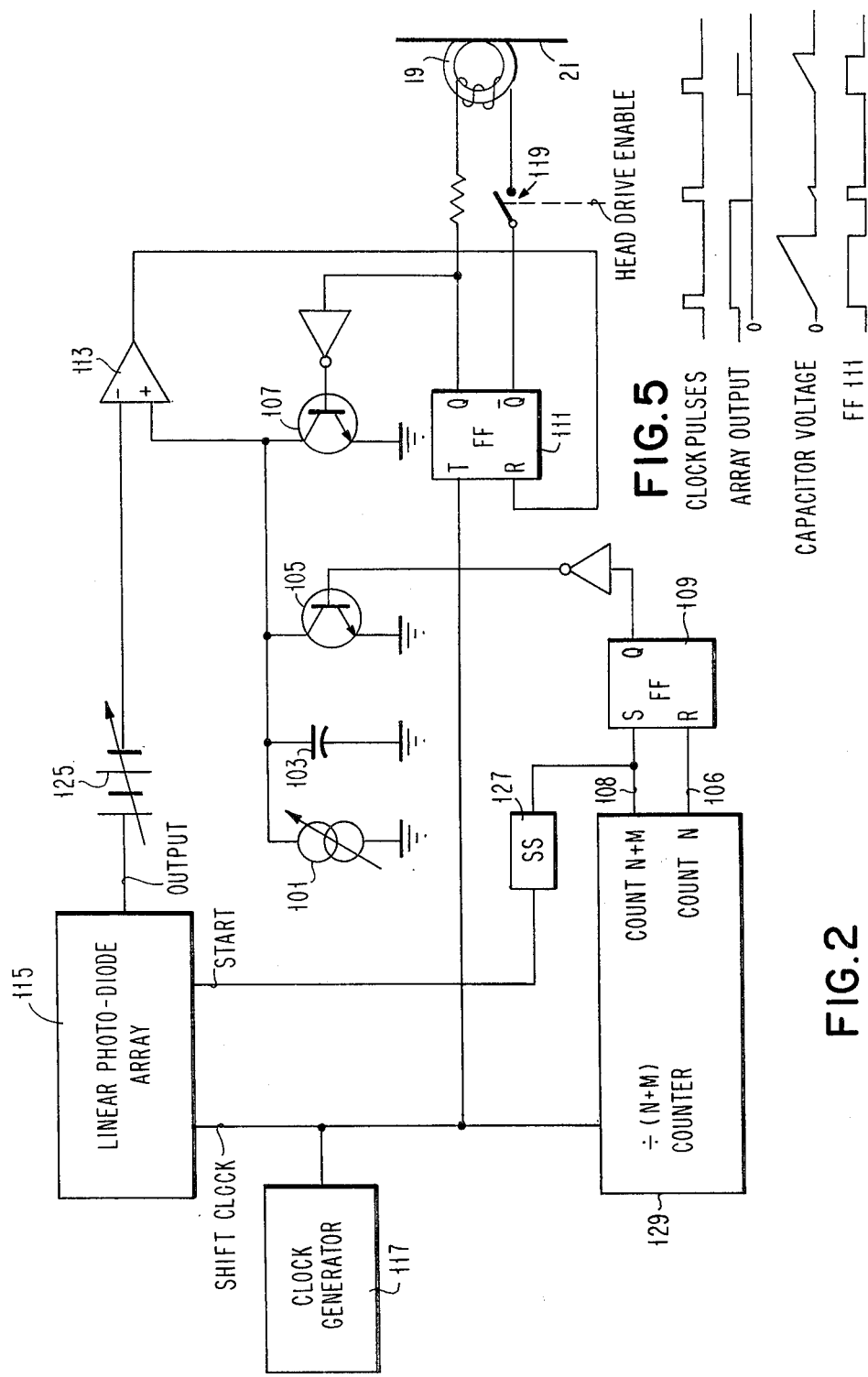
FIG. 2 is a more detailed block diagram of the controlling electronics, and the voltage-to-time converter thereof, shown in FIG. 1.

Referring to FIG. 2 and FIG. 5 which is a timing diagram illustrating signal levels at various points within the block diagram of FIG. 2, the voltage-to-time converter functions will now be described. The central part of the circuit is current source (101) which charges capacitor (103) whenever transistors (105, 107) allow it to do so. This happens when control flip-flops (109, 111) are both set. Assume initially that flip-flop (109) is toggled set and hence transistor (105) is turned off, unclamping the voltage-to-time converter. As described subsequently, flip-flop (109) is set and the converter enabled simultaneously with array (115) getting a start pulse. A pulse out of clock generator (117) causes flip-flop (111) to toggle set and causes new pixel information to be presented by array (115) to comparator (113). The charging of capacitor (103) starts immediately and continues until comparator (113) detects that the voltage on capacitor (103) has matched the voltage being produced by the linear photodiode array (115). The comparator (113) then causes flip-flop (111) to reset, which in turn causes transistor (107) to turn on and discharge capacitor (103). Comparator (113) then returns to its original condition and the circuit is stable.

The next pulse out of clock generator (117) causes a new pixel to be presented by array (115) to comparator (113) and also causes flip-flop (111) to toggle set again. The above-described integrate-and-dump cycle then repeats.

If the head-drive enable switch (119) is closed during this cycling, the current through the recording head (19) will alternate direction as controlled by flip-flop (111) and will impose corresponding magnetization on magnetic media (21). Offset adjust (125) is set so that when the output of array (115) is zero, a minimum cycle time of flip-flop (111) is assured. Likewise, the magnitude of current source (101) is set so that when the output of array (115) is at its maximum, a maximum cycle time of flip-flop (111) is assured. Thus, successive changes of the magnetization of media (21) will always be sufficiently far enough apart to be recoverable.

It is a characteristic of the linear photodiode array (115) that, once all of its diodes have been examined, no further outputs are generated until the receipt of a start pulse. This start pulse is provided by single shot (127) which is triggered by a trigger pulse on output (108) once per cycle of frequency divider (129). The frequency divider (129) issues a second pulse on output (106) once per cycle that is out of phase with the single-shot (127) trigger pulse (108). These two pulses (106, 108) are used to set and reset flip-flop (109) which controls the converter through transistor (105). Flip-flop (109) is set and the converter enabled simultaneously with array (115) getting a start pulse. There being N photodiodes in array (115), flip-flop (109) is reset and the converter disabled when all N photodiodes have been examined. This state continues for M more counts, and then another array-scanning cycle commences.

During the time that flip-flop (109) has the voltage-to-time converter clamped of, no reset pulses are presented by comparator (113) to flip-flop (111). It thus cycles at one-half the frequency of the clock generator. This operation mode puts a characteristically different magnetization pattern on media (21) which serves to denote line sync to the signal-recovery circuits shown in FIG. 3.

Persons skilled in the art will be able to develop other circuits which perform the same function described above. Several possible variations, but by no means an exhaustive list, are to combine the operation of transistors (105, 197) by using a single transistor attached by suitable logic to flip-flops (109, 111); to use the clock generator (117) in the operation of single shot (127); to subdivide counter (129) into two distinctly different counters; taking the logarithm of the array voltage before applying it to the comparator; etc. All such circuit variations are within the spirit and scope of the present invention so long as the resulting circuit causes a change in direction of magnetization in the recording media at the start of each pixel, and the opposite change in magnetization some time after the first change, the amount of time being proportional to the gray-scale value of the pixel being recorded.

Figure 3:
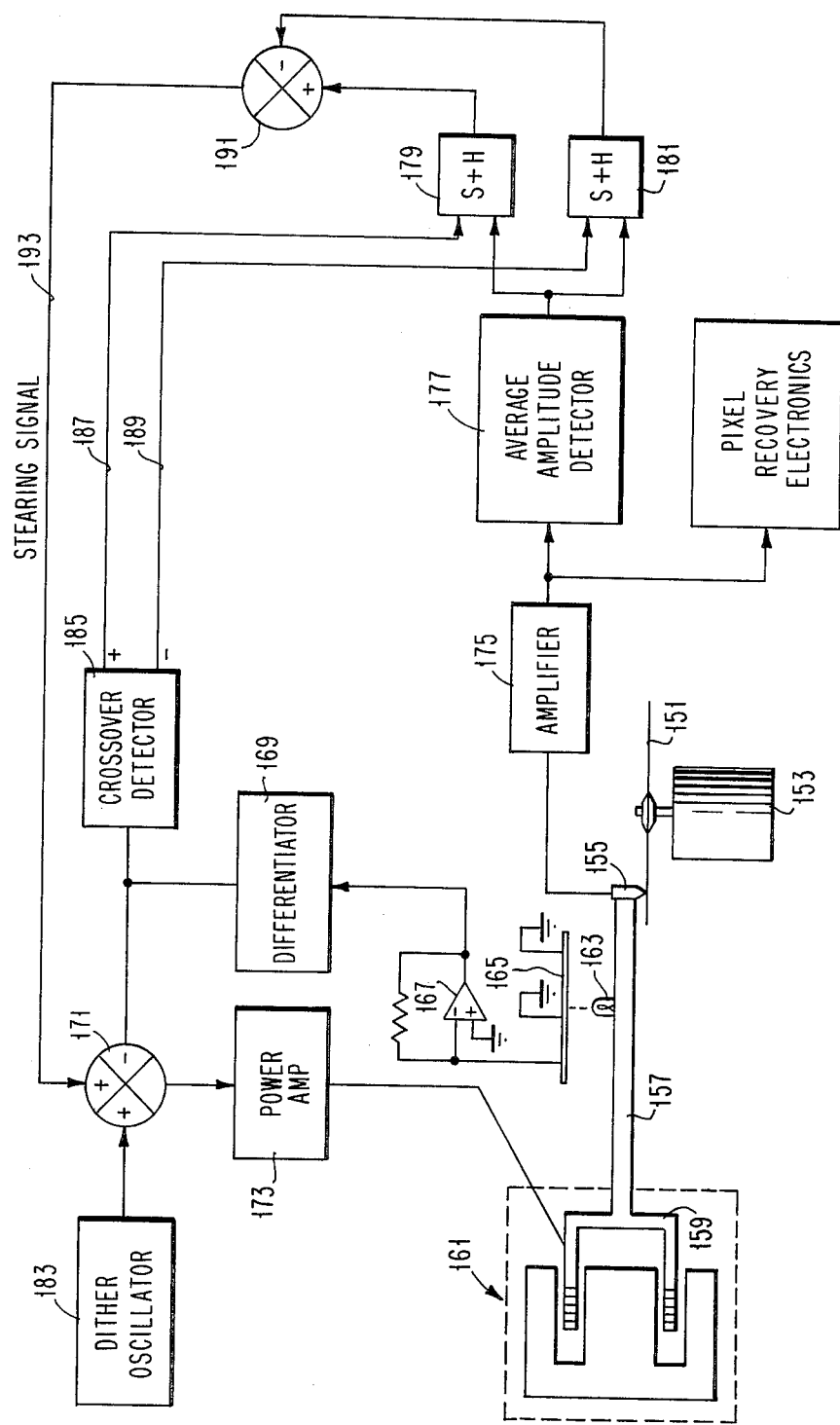
FIG. 3 is a drawing of a playback mechanism along with a block diagram of its controlling electronics.

Referring to FIG. 3, the playback station will be described. The principal problem is that the recorded track produced by the mechanism of FIG. 1 is a spiral which must be tracked by a playback head. One method to do this is to dither the playback head around the center of the recorded track. An average steering signal is then derived from the relative amplitudes of the signal levels found at the extremes of the dither. This approach to the problem requires a mechanism of some agility, which is why the present embodiment was selected.

Magnetic disk (151) on which information has been recorded is spun by motor (153) next to playback head (155). The head (155) is positioned by playback head carriage (157) (bearings and guide rails not shown) which is connected to the armature (159) of linear motor (161), energizable by means of a coil wrapped around the armature (159). A lamp (163) is also mounted on playback head carriage (157) so that it illuminates a differential photodetector (165). This type of photocell is built long and narrow. Photoelectrons generated in the cell are collected at one end or the other, with the end that is closest to the point of generation getting proportionately more. Thus the output of amplifier (167) bears a direct relationship to the relative position of the playback head carriage (157). The output of amplifier (167) is connected to differentiator (169) in order to drive power amplifier (173) through summing junction (171), the output of which supplies current to the coil wrapped around the armature (159) of linear motor (161). Thus a velocity loop is closed around this relatively light-weight and friction-free mechanism.

The output of playback head (155) is connected to amplifier (175) whose output drives an average amplitude detector (177) which is essentially a full-wave rectifier and filter. The derived amplitude information is made available to two sample-and-hold circuits (179, 181). The trigger pulses for these circuits are derived as follows. A dither oscillator (183) feeds the above-described velocity loop through summing node (171) so that head (155) vibrates back and forth perpendicular to the recorded spiral on disk (151). The amplitude of the dither signal is adjusted so the head (155) moves about one-quarter of the width of the recorded track. The motion of head (155) is followed by the differential photodetector (165), and the resultant signal appears at the output of the differentiator (169). Crossover detector (185) gives output pulses (187) for positive zero crossings (corresponding to maximum negative travel of the carriage, 157) and pulses (189) for negative zero crossings (corresponding to maximum positive travel of the carriage, 157). These pulse trains (187, 189) trigger the sample-and-hold circuits (179, 181) respectively. The result is that sample and hold (179) holds the amplitude of the playback signal found at maximum negative motion while sample and hold (181) holds the amplitude of the playback signal found at maximum positive motion. The outputs are subtracted from each other in summing node (191), the result being proportional to the relative position of the center of the recorded track and is termed the steering signal (193). This steering signal (193) is connected into the velocity loop at summing node (171) and constitutes a velocity request. If the steering signal (193) is zero, the playback head carriage (157) will continue to move back and forth in response to dither oscillator (183). If the steering signal (193) is not zero, the playback head carriage (157) will be moved in the appropriate direction until the steering signal is zero.

Figure 4:
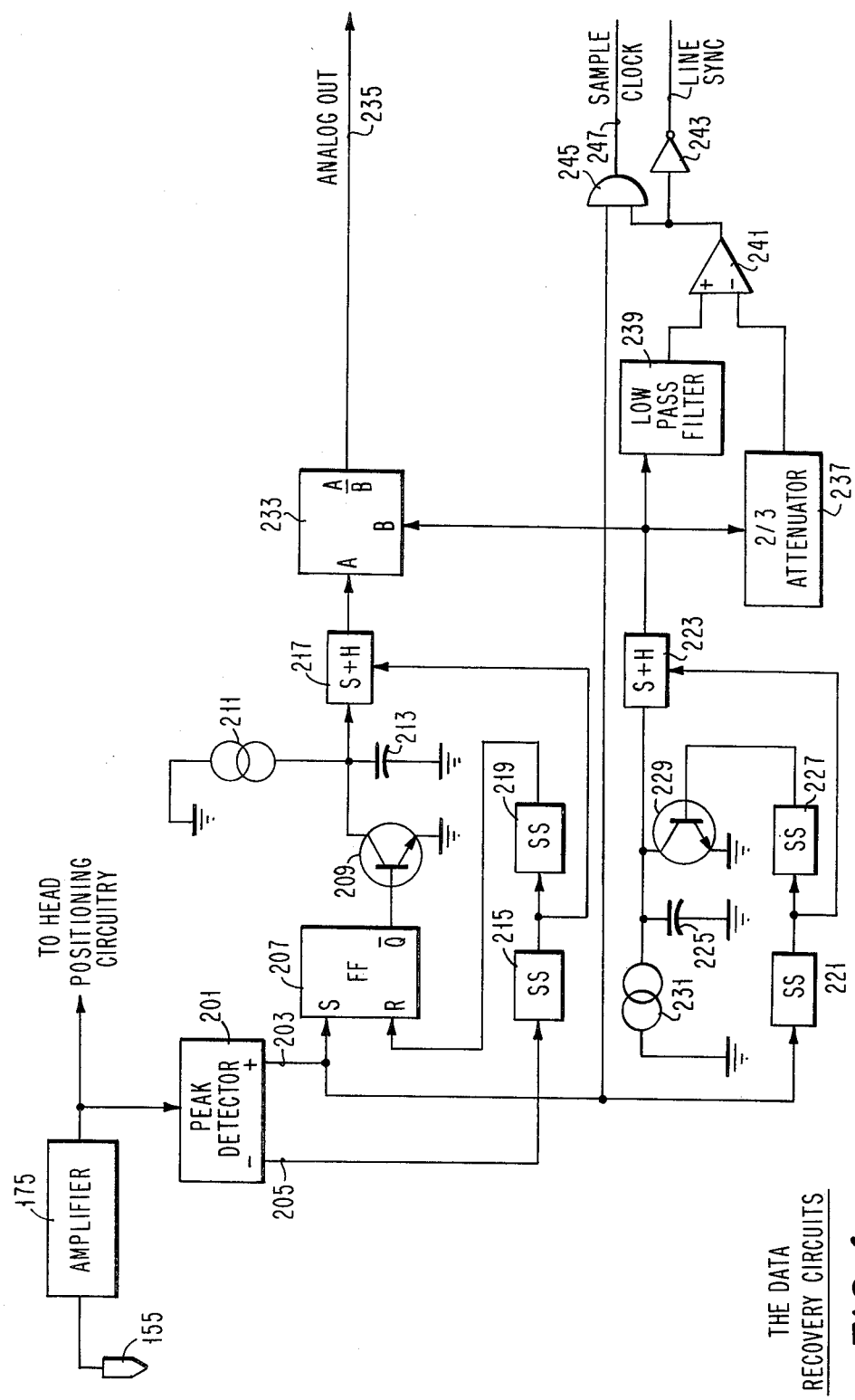
FIG. 4 is a block diagram of a data-recovery circuit.

Referring to FIG. 4, the data-recovery circuits within the block labeled PIXEL RECOVERY ELECTRONICS in FIG. 3 will now be described. The signal from playback head (155), having been processed by amplifier (175), will have a triangular or sawtooth waveform. This signal is next processed by peak detector (201), so the relative timing of the reversals in the magnetic field made during the recording process is recovered. In the convention established in FIG. 2, positive pulses (203) correspond to cell boundaries and thus yield timing information while the relative spacing of the negative pulses (205) with respect to their immediately preceding positive pulses contain the pixel or gray-scale information. The circuits shown in FIG. 4 recover both types of information.

The positive pulses (203) repeatedly set flip-flop (207) which turns off transistor (209) which in turn allows current source (211) to charge capacitor (213). The negative pulses (205) trigger single shot (215) which in turn triggers sample and hold (217) which stores the amplitude of the voltage then present on capacitor (213). As single shot (215) times out, it triggers single shot (219) which resets flip-flop (207) which in turn drives transistor (209) which dischargeds capacitor (213). Thus the output of sample and hold (217) is a voltage proportional to the absolute time between each positive pulse and the immediately following negative pulse.

The positive pulses also trigger single shot (221) which in turn triggers sample and hold (223) which stores the voltage then present on capacitor (225). As single shot (221) times out, it triggers single shot (227) which momentarily turns on transistor (229). This causes the discharge of capacitor (225). As soon as transistor (229) turns off, current source (231) commences to charge it up again. Thus the output of sample and hold (223) is a voltage proportional to the absolute time between successive positive pulses.

The outputs of sample and holds (217, 223) are combined by analog divider (233) so that their ratio is computed. The analog output voltage (235) is always proportional to the relative time between successive positive pulses and their immediately following negative pulses. The first effect is that the speed of the disk (153) during playback is not important. In addition, the absolute speed of the disk (153) during the record operation is also unimportant. This eases the constraints on both the record and playback disk drive servos.

It was mentioned in the description of FIG. 2 that head-current-control flip-flop (111) will toggle at half frequency between successive scans of the linear photodiode array (115). The result is that the distance between successive positive transitions as recorded on the disk is double between successive scans of the linear photodiode array (115). Thus during playback, the voltage out of sample and hold (223) will be double for a short time. This condition is spotted as follows. The sample and hold (223) drives both a low-pass filter (239) and a two-thirds attenuator (237). These circuits in turn drive comparator (241). Usually the output of sample and hold (223) is stable, or is changing slowly, so the output of comparator (241) is high. Its output falls when the output of sample and hold (223) doubles as described above. The comparator's output is inverted to form the output signal line sync (243). Comparator (241) is also used to control the AND gate (245) which, during the replay of a line, sends the positive pulses (203) of peak detector (201) onward as the sample clock (247). During line sync, then, sample clock is inhibited.

People skilled in the art will be able to design other schemes to encode pixel information onto a recording media. The present technique having been described, its relative merits with respect to two alternate techniques can be discussed.

The most common gray-scale encoding technique is that used by videotape recorders. The pixel information is used to drive a variable frequency oscillator. The data is recovered by triggering a single shot with every transition recovered from the recording media; the output of the single shot is then sent through a low-pass filter. The encoding technique of the present invention has the following advantages. First, it is independent of the absolute speed of the media, so less expensive servos are needed. Second, servo start-up transients are easily handled. Third, being a sampled-data technique, the present encoding approach does not degrade the resolution of the sampled data source, while a VCO would smear pixels together. Fourth, being a sampled-data technique, the present encoding approach can easily tell the final information user when to sample the output, while the time for sampling a VCO output is unclear.

Another encoding approach is to connect the output of the linear array to an ADC and record the resulting digital data stream. The encoding technique of the present invention has the following advantages. First, the required circuitry is simpler and thus cheaper. Second, the present invention requires less media since each pixel is self-synchronizing; making a digital encoded scheme equally resistant to errors would take considerable overhead.

What has been described is an apparatus and method of scanning an object in order to electronically capture an image of the object and electronically record that image onto a recording medium. This is accomplished by focusing the object to be scanned at the image focal plane of an imaging lens. Next, a self-scanning-linear array of light-sensitive devices is moved in the image plane, such that light from the object focused at the image plane falls upon the light-sensitive devices. The output of the array is utilized at sequential position intervals of the array as the array is moved in the image plane, to thus provide a line scan in two dimensions of the image focused at the image focal plane. Finally, the output is recorded onto a recording medium that is moved in synchronism with the motion of the self-scanning-linear array of light-sensitive devices in the image plane.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. An electronic camera comprising:
  a lens for focusing the image of an object at the focal plane of said lens to thereby produce an optical image at said focal plane;
  a linear array of light-responsive devices arranged to scan said optical image to thereby produce, at an output of said array, a series of electrical signals representing said optical image;
  a recording head;
  a recording medium;
  first means for imparting relative motion between said recording medium and said recording head, said motion being in a first direction such that data may be recorded at a first location on said recording medium;
  said recording head including recording means for recording data on said recording medium, as said recording medium and said recording head are moved with respect to each other;
  second means connected to said array and to said recording head for moving said array and said recording head in synchronism,
  said array being moved by said second means in a direction that is perpendicular to the optical axis of said lens, to thereby scan said optical image,
  said recording head being moved with respect to said recording medium by said second means in a second direction such that said recording head is moved to a second location on said recording medium; and,
  means connected to said output of said array and to said recording means of said recording head for recording said series of electrical signals representing said optical image onto said recording medium.

2. A scanning and recording apparatus comprising:
a focusing lens for focusing, at the image focal plane of said lens, the image of an object to be scanned;
a linear array for scanning a row of light-sensitive devices to provide a train of output pulses proportional in magnitude to the light intensity falling upon each successively scanned light-sensitive device;
means for holding said array in the image plane of said lens, said holding means including means for allowing relative movement between said array and said lens in a direction that is perpendicular to the optical axis of said lens, the relative motion between said array and said lens being allowed corresponding to a measured distance in said image plane;
means for deriving an output from said array at sequential position intervals of said array as said array is moved in said image plane, to thus provide an electrical signal output corresponding to a line scan in two dimensions of said image focused at said image focal plane;
a recording device, including a recording head, a recording medium, and first means for moving said recording head and said recording medium with respect to each other;
second means for moving said array in said direction that is perpendicular to said optical axis of said lens and said recording head with respect to said recording medium, said recording head being moved in synchronism with the motion of said array of light-sensitive devices in the image plane; and,
means connected to said output of said array and to said recording head for recording said electrical signal onto said recording medium.

3. A scanning and recording apparatus comprising:
a focusing lens for focusing, at the image focal plane of said lens, the image of an object to be scanned;
a linear array for scanning a row of light-sensitive devices to provide a train of output pulses proportional in magnitude to the light intensity falling upon each successively scanned light-sensitive device;
means for deriving an output of the array at sequential position intervals of the array as the array is moved in the image plane, to thus provide an electrical signal output corresponding to a line scan in two dimensions of the image focused at the image focal plane;
a recording device, including a recording head, a recording medium, and means for moving said recording head with respect to said recording medium;
means for moving said array in the image plane of said lens in a direction that is perpendicular to the optical axis of said lens, and for moving said recording head, said recording head being moved in synchronism with the motion of said array in the image plane; and,
means for recording said electrical signal output onto said recording medium as said recording medium is moved with respect to said recording head and said recording head is moved in synchronism with the motion of said linear array of light-sensitive devices in the image plane.

4. The combination in accordance with claims 1, 2, or 3 wherein said means for moving said array and said recording device includes means for mechanically connecting said array and said recording device.

5. The combination in accordance with claims 1, 2 or 3 wherein said recording medium is of a type in which information is stored by changing the state of said medium alternately between two different states and wherein said recording head causes a first change in said state of said recording medium at the start of each pixel of a plurality of pixels comprising the scanned image, and an opposite change in the state of said recording medium a time interval after said first change, the amount of said time interval being proportional to the gray-scale value of the pixel being recorded.

6. The combination in accordance with claim 5 wherein said recording medium is a photographic film.

7. The combination in accordance with claim 5 wherein said recording medium is a magnetic recording disk.

8. The combination in accordance with claim 5 wherein said recording medium is a magnetic recording tape.

9. The combination in accordance with claim 5 wherein said recording medium is a video disk.

10. The method of scanning an object and recording the image of said object comprising the steps of:
(1) focusing the object to be scanned at the image focal plane of an imaging lens;
(2) causing relative motion between said lens and a linear array of light-sensitive devices in the image focal plane of said lens, such that light from the object focused at said image focal plane falls upon said light-sensitive devices, said array and said lens being moved with respect to each other in a direction that is perpendicular to the optical axis of said lens,
(3) utilizing the output of said array at sequential position intervals of said array with respect to the relative position of said array in the image focal plane of said lens;
(4) moving a recording medium with respect to a recording head, said motion being in a first direction such that data may be recorded at a first location on said recording medium;
(5) applying said signal output line scan to said recording head, said recording head including recording means for recording data on said recording medium at said first location on said recording medium, as said recording medium and said recording head are moved with respect to each other; and,
(6) moving said recording head with respect to said recording medium in synchronism with the motion of the linear array of light-sensitive devices in the image plane, said array being moved in a direction that is perpendicular to the optical axis of said lens, to thereby scan said optical image, and said recording head being moved with respect to said recording medium in a second direction such that said recording head is moved to a second location on said recording medium.

11. The method of electronically capturing and recording photographic images comprising the steps of:
(1) focusing at the image focal plane of a lens, the image of an object to be scanned;
(2) holding an array in said image plane of said lens, said array being comprised of light-responsive devices which produce at an output thereof a stream of discrete signals representative of light intensity falling upon said devices;

(3) causing relative motion between said array and said lens in a direction that is perpendicular to the optical axis of said lens, such that successive portions of said image are scanned by said array, (4) moving a recording head with respect to a recording medium in synchronism with the relative motion between said array and said lens; and, (5) applying said stream of signals to said recording head to thereby record said signals on said recording medium.

12. A method of scanning an object in order to electronically capture an image of the object and electronically record that image onto a recording medium comprising the steps of:

(1) focusing the object to be scanned at the image focal plane of an imaging lens;

(2) moving a linear array of light-sensitive devices with respect to said imaging lens, said motion being in the image plane and in a direction that is perpendicular to the optical axis of said lens, such that light from the object focused at the image plane falls upon the light-sensitive devices;

(3) utilizing the output of the array at sequential position intervals of the array as the array is moved in the image plane, to thus provide a signal output line scan in two dimensions of the image focused at the image focal plane;

(4) moving a recording medium with respect to a recording head;

(5) applying said signal output line scan to said recording head; and, (6) moving said recording head with respect to said recording medium in synchronism with the motion of the linear array of light-sensitive devices in the image plane.

13. The method in accordance with claims 12, 10, or 11 wherein said recording medium is a magnetic recording disk.

14. The method in accordance with claims 12, 10, or 11 wherein said recording medium is a video disk.

15. The method in accordance with claims 12, 10, or 11 wherein said recording medium is a magnetic recording disk.

16. In an electronic camera having a focusing lens for focusing at the image focal plane of said lens, the image of an object to be scanned, and means for holding an array in said image plane of said lens, said array being comprised of light-responsive devices which produce at an output thereof a stream of discrete signals representative of light intensity falling upon said devices, said camera including array motion control means for causing relative motion between said array and said lens in a direction that is perpendicular to the optical axis of said lens, such that successive portions of said image are scanned by said array, apparatus for electronically storing the image of said object focused at said image focal plane of said lens comprising:

a recording device, including a recording head, a recording medium, and means for moving said recording head with respect to said recording medium;

means connected to said recording head and to said array motion control means for causing relative motion between said recording medium and said recording head in synchronism with the relative motion between said array and said lens; and, means connected to said array output and to said recording head for recording on said recording medium said stream of signals.

17. The combination in accordance with claim 16 wherein said recording medium is a photographic film.

18. The combination in accordance with claim 16 wherein said recording medium is a magnetic recording disk.

19. The combination in accordance with claim 16 wherein said recording medium is a magnetic recording tape.

20. The combination in accordance with claim 16 wherein said recording medium is a video disk.

* * * * *